United States Patent
Boynton et al.

[11] 3,719,880
[45] March 6, 1973

[54] SERVO COMPENSATION INCLUDING A NON-LINEAR SYNCHRO TRANSMITTER

[75] Inventors: Richard P. Boynton; Robert C. Ellis, Jr., both of Durham, N.C.

[73] Assignee: Sperry Rand Corporation, New York, N.Y.

[22] Filed: Dec. 10, 1970

[21] Appl. No.: 96,873

[52] U.S. Cl. ............318/633, 318/584, 318/654, 318/692, 318/620
[51] Int. Cl. ...................G05b 11/01, G05d 23/275
[58] Field of Search......310/584, 632, 633, 654, 692, 310/620

[56] References Cited

UNITED STATES PATENTS

| | | | |
|---|---|---|---|
| 2,603,696 | 7/1952 | McEwan | 318/692 X |
| 2,814,767 | 11/1957 | Gray | 318/633 |
| 3,234,444 | 2/1966 | Burmeister et al. | 318/633 |

OTHER PUBLICATIONS

Resolver Handbook, Reeves Inst. Corp., Rico Bulletin No. 57, Copyright 1954, Assorted pages.

Primary Examiner—T. E. Lynch
Attorney—S. C. Yeaton

[57] ABSTRACT

A conventional synchro device; including a rotor, a stator, a three-phase winding and a single phase winding, is modified by the addition of a trim winding which is inductively coupled to the three phase winding and provides non-linear operation of the synchro. The trim winding is electrically coupled to the single phase winding to provide a null indication when the respective output voltages from these windings are substantially equal. In order to obtain the null indication, output angle data from the synchro must vary in a non-linear manner with respect to applied input angle data. An additional shorted damping winding, may be inductively coupled to the single phase winding and the trim winding to produce a flux which counteracts flux induced in the single phase and trim windings thereby reducing the voltages in the trim winding and the single phase winding. The voltage in the single phase winding is reduced to a greater extent than the voltage in the trim winding and the non-linearity between the input angle data and the output angle data over limited ranges of input angle is further increased.

7 Claims, 4 Drawing Figures

SERVO COMPENSATION INCLUDING A NON-LINEAR SYNCHRO TRANSMITTER

BACKGROUND OF THE INVENTION

1. Field of the Invention

The present invention pertains to the field of variable transformers which are a class of magnetic field transducers. More specifically, the invention is applicable to those devices commonly known as synchros and includes control transformers, control transmitters and differential transmitters among others.

2. Description of the Prior Art

The prior art devices include a stator, a rotor, an input winding and an output winding. These windings are wound on a magnetic structure usually in combinations of single phase and three phase windings. For example, a control transmitter may have a single phase winding on the rotor and a three-phase winding on the stator. The term "phase" in reference to synchros generally refers to the angular position of the various windings and does not refer to time phase. When an input alternating voltage is applied to the single phase rotor winding, it induces voltages in the three-phase stator winding having magnitudes and polarities which uniquely define a resulting angle that is a function of the input angular position of the rotor with respect to the stator.

In a control transformer, the three-phase winding and the single phase winding are mounted in the same manner as in the control transmitter. The alternating input voltages are applied to the three-phase stator winding and uniquely define an input angle which induces an alternating voltage in the rotor winding. The rotor winding voltage is proportional to the difference between the input angle and the resulting mechanical angular position of the rotor with respect to the stator. In these devices, the resulting angle is linearly related to the input angle.

Where it has been desired to have a particular range of output angle vary slightly in response to large variations in angular input or have a a particular range of output angle vary greatly in response to small variations in angular input, conventional synchro devices have been found to be insufficient.

Applications for devices having a non-linear relationship between applied input angle data and produced output angle data include aircraft indicator instruments. For example, during flight only course control of an aircraft may be desired. Thus, an indicator may be required to provide a small output displacement in response to a first input signal of a given magnitude whereas during a landing maneuver flying control of the aircraft is desired and the same indicator may be required to provide a large output displacement in response to a second input signal having the same magnitude as the first input signal. A prior art device which enables an indicator to provide such non-linear operation is disclosed in U.S. Pat. No. 3,316,532 entitled "Aircraft Follow-Up Servo-Mechanism Indicating Apparatus" issued Apr. 25, 1967 to Richard E. Schaffer and assigned to the same assignee as the subject invention. Prior art devices such as that disclosed in U.S. Pat. No. 3,316,532 required complex apparatus which included feedback circuitry or a plurality of synchros, to obtain a non-linear angular relationship between the input angle data and the output angle data. The non-linear synchro disclosed herein is an improvement over the apparatus described in U.S. Pat. No. 3,316,532.

SUMMARY OF THE INVENTION

The present invention is a synchro device having at least one trim winding in addition to the conventional three-phase and single phase windings thereby providing a non-linear relationship between applied input angle data and produced output angle data. The trim winding is inductively coupled to the three-phase winding and electrically coupled to the single phase winding so that the flux produced by the three phase winding induces voltages in both the single phase winding and the trim winding. A null voltage occurs when the instantaneous trim winding voltage is equal to the instantaneous single phase winding voltage. For given values of applied input angle data successive null voltages are obtained for values of output angle data which are non-linear functions of the applied input angle data. The degree of non-linearity is controlled by varying the ratio of the maximum voltage induced in the trim winding to the maximum voltage induced in the single phase winding to obtain a null voltage. Further control of this non-linearity may be obtained by providing at least one shorted damping winding that is inductively coupled to the single phase winding to produce a flux which reduces the total flux within the synchro. As a result, the magnitudes of the trim winding and the single phase winding maximum voltages are also reduced. By appropriate design of the shorted damping winding, its effect on the single phase winding voltage may be varied with respect to its effect on the trim winding voltage thereby providing expansion and contraction of the non-linear relationship between the input angle data and the output angle data over specific ranges of input angle data.

This invention enables reduction in the cost and the complexity of servo mechanism apparatus which provide angle output data as a non-linear function of the angle input data.

DESCRIPTION OF THE PREFERRED EMBODIMENT

Figure 1:
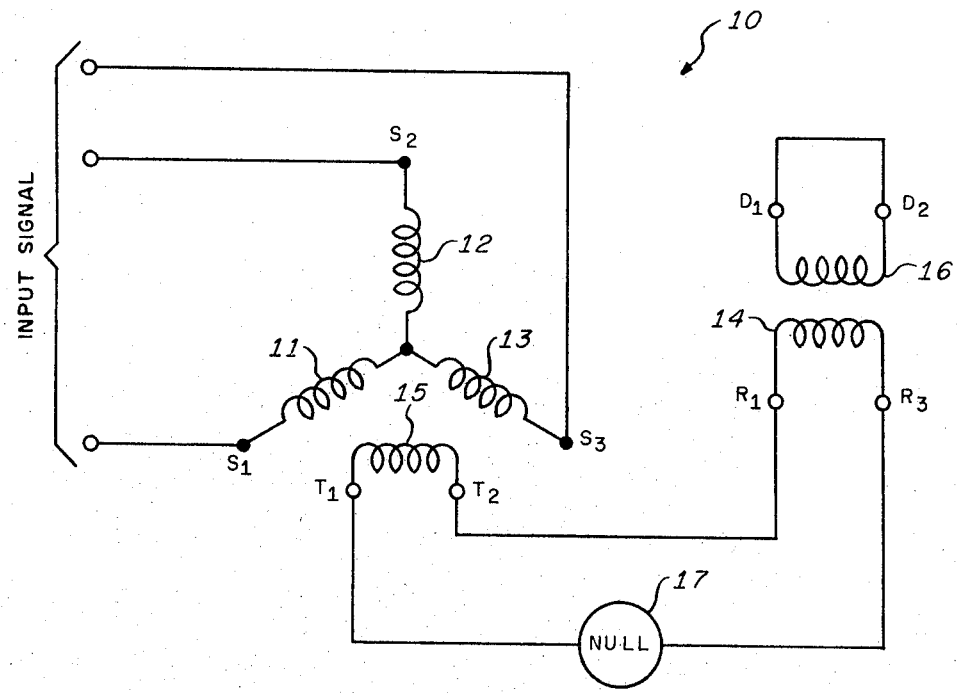
FIG. 1 is a schematic drawing of a conventional synchro transformer including the invention.

As shown in FIG. 1, a non-linear synchro 10 includes a conventional synchro transformer comprised of three stator mounted wye connected windings 11, 12 and 13, and a rotor winding 14. A first winding added to the conventional synchro transformer windings is a trim winding 15 which is wound in quadrature with a stator winding. FIG. 1 shows the trim winding 15 wound in quadrature with the stator winding 12. A second winding, which is added to the rotor, is a damping winding 16 shown with its output terminals $D_1$ and $D_2$ shorted together. The trim winding 15 is electrically coupled to the rotor winding 14 through a null meter 17 which provides a null indication when there is a minimum difference between the output voltages on terminals $T_1$ and $T_2$ of the trim winding 15 and terminals $R_1$ and $R_3$ of the rotor winding 14.

In a conventional synchro transformer an alternating three-phase electrical signal which defines an input angle $\theta_{in}$ is applied to input terminals $S_1$, $S_2$ and $S_3$ of the stator windings 11, 12 and 13. A resulting voltage is provided at the output terminals $R_1$ and $R_3$ of the rotor winding 14 which is proportional to the sine of the difference angle $\Delta\theta$ between the angle $\theta_{in}$ of the applied electrical signal and the mechanical angle $\theta_{out}$ of the synchro electrical signal and the mechanical angle $\theta_{out}$ of the synchro transformer rotor with respect to the synchro transformer stator. Subsequently, the shaft on which the rotor is wound rotates until the mechanical angle $\theta_{out}$ is equal to the angle $\theta_{in}$ of the applied electrical signal. The voltage provided at the output terminals $R_1$ and $R_3$ becomes zero because the difference angle $\Delta\theta$ is zero. Therefore, in the conventional synchro transformer, the output angle $\theta_{out}$ is essentially equal to the input angle $\theta_{in}$, i.e., the output angle $\theta_{out}$ is a linear function of the input angle $\theta_{in}$.

In order to simplify the explanation of the invention, the effect of the trim winding 15 and the null meter 17 will be disussed initially, and the description of the damping winding 16 will be presented subsequently. The output angle $\theta_{out}$ will be redefined as the mechanical angle $\theta_{out}$ required to obtain a null indication on the null meter 17 for any angle $\theta_{in}$ of an applied three-phase electrical signal. The expression for the output voltage across the terminals $R_1$ and $R_3$ is:

$$E_0 = E_{OM} \sin \Delta\theta$$

in which:
$E_{OM}$ = maximum rotor winding output voltage
$\Delta\theta = \theta_{out} - \theta_{in}$
The expression for the output voltage across terminals $T_1$ and $T_2$ is:

$$E_T = E_{TM} \sin \theta_{in}$$

in which: $E_{TM}$ = maximum trim winding output voltage
$\theta_{in}$ = angle defined by the applied three-phase electrical signal.
Since a null indication will be obtained on the null meter 17 when the difference between the rotor winding output voltage $E_O$ and the trim winding output voltage $E_T$ is zero, then $E_O$ equals $E_T$. Substituting the above expressions:

$$E_{OM} \sin \Delta\theta = E_{TM} \sin \theta_{in}$$

$$\sin \Delta\theta = (E_{TM}/E_{OM}) \sin \theta_{in}$$

the degree of non-linearity as represented by $\sin \Delta\theta$ is proportional to the product of the ratio of the maximum trim winding output voltage to the maximum rotor winding output voltage and the sine of the input angle $\theta_{in}$.

Figure 2:
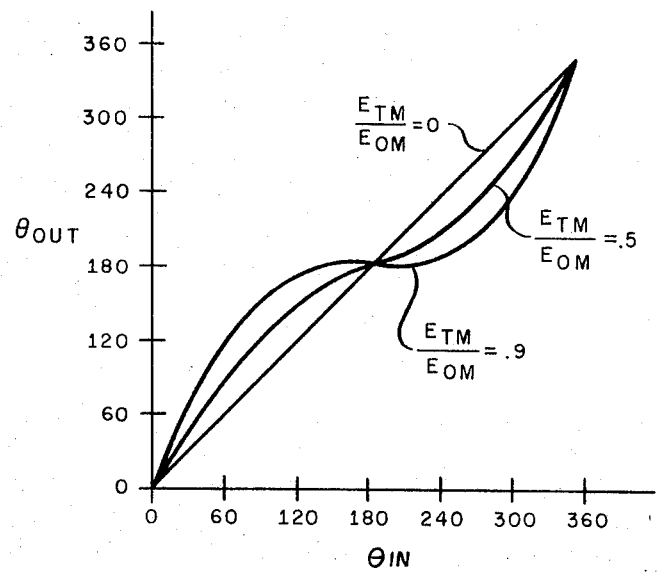
FIG. 2 is a graph of input angle data versus output angle data of the invention without the shorted damping winding for three different ratios of $E_{TM}/E_{OM}$.

FIG. 2 shows a plot of the input angle $\theta_{in}$ against the the output angle $\theta_{out}$ for three different ratios of $E_{TM}/E_{OM}$. It will be observed that the degree of non-linearity increases as this ratio increases. Generally, the slope of the plot increases from linearity i.e., $(E_{TM}/E_{OM})$ = 0, for values of input angle between 0°–90° and for values between 270°–360°, whereas for values between 90°–270b$L$ it decreases.

The damping winding 16 is wound in phase with the rotor winding 14 and its function is to reduce the amount of flux within the synchro 10. The magnitude of this reduction is controlled by two factors: The first being the volume of copper employed in constructing the damping winding 16 and the second, the percentage of flux within the synchro 10 that links the damping winding 16. The former is a function of the length and the diameter of the copper in the damping winding 16 and the latter is a function of the spatial positioning of the turns in the winding 16 with respect to the stator winding and the rotor winding. The trim voltage $E_T$ and the rotor winding voltage $E_O$ are reduced by the addition of the damping winding 16. However, each will vary in a different manner. These variations may be expressed as functions of the difference angle $\Delta\theta$ as:

$$E_T = (E_{TM} \sin \theta_{in}) [f_1 (\Delta\theta)]$$

$$E_O = (E_{OM} \sin \Delta\theta) [f_2 (\Delta\theta)]$$

since the rotor winding 14 and the trim winding 15 are connected to provide zero output when the rotor winding voltage equals the trim winding voltage, then:

$$(E_{TM} \sin \theta_{in}) [f_1 (\Delta\theta)] = (E_{OM} \sin \Delta\theta) [f_2 (\Delta\theta)]$$

for zero voltage output. In this configuration the damping winding 16 is wound in phase and on the rotor with the rotor winding 14 it is therefore closer in proximity to the rotor winding 14 than to the trim winding 15, as a result it will provide a greater reduction in the induced voltage in the rotor winding 14 than in the induced voltage in the trim winding 15. This reduction is non-linear over limited ranges of input angle $\theta_{in}$.

From the foregoing it can readily be appreciated by those skilled in the art that there is a wide latitude for selecting combinations involving the parameters $E_{OM}$, $E_{TM}$, $f_1 (\Delta\theta)$ and $f_2 (\Delta\theta)$ to obtain non-linear variations in expansion and contraction of the plot of the input angle $\theta_{in}$ against the output angle $\theta_{out}$.

An alternate embodiment of the subject invention will be described with reference to FIG. 1. In the alternate embodiment, the damping winding 16 is eliminated and damping is obtained by using an unbalanced three-phase winding in the non-linear synchro 10. For example, the windings 11 and 13 would comprise N number of turns and the winding 12 would be KN number of turns in which K is a factor greater or less than unity. When the non-linear synchro 10 with an unbalanced three-phase winding 12 is used as a CT, the variation in load impedance which the non-linear synchro 10 presents to a transmitter is reduced. Further, if the non-linear synchro 10 is coupled to a signal voltage source having an appreciable source impedance, lower null voltages are obtainable by using the non-linear synchro 10 having an unbalanced three-phase winding 12.

In operation, a non-linear synchro 10 having an unbalanced three-phase winding 12 is unbalanced such that at a zero input angle, no flux is produced by the unbalanced winding 12. Thus, the gradient or degree of non-linearity is essentially the same as would be obtained with no damping. As the input angle is varied from zero, the component of flux produced by the unbalanced winding 12 provides a successively larger percentage of the total flux in the non-linear synchro 10. Therefore, the total flux varies as a function of the input angle, increasing the voltage induced in the output winding 14. The trim winding 15 is disposed so that the component of flux linking it is less sensitive to this change in flux thereby changing the ratio of the voltage across the terminals $R_1$ and $R_3$ with respect to the voltage across the terminals $T_1$ and $T_2$ thus providing damping of the output voltage across the terminals $R_1$ and $R_3$. This ratio is controllable over a wide range of variation as determined by the factor K and the other physical parameters of the non-linear synchro 10, such as the number of turns N and the relative placement of the windings.

Figure 3:
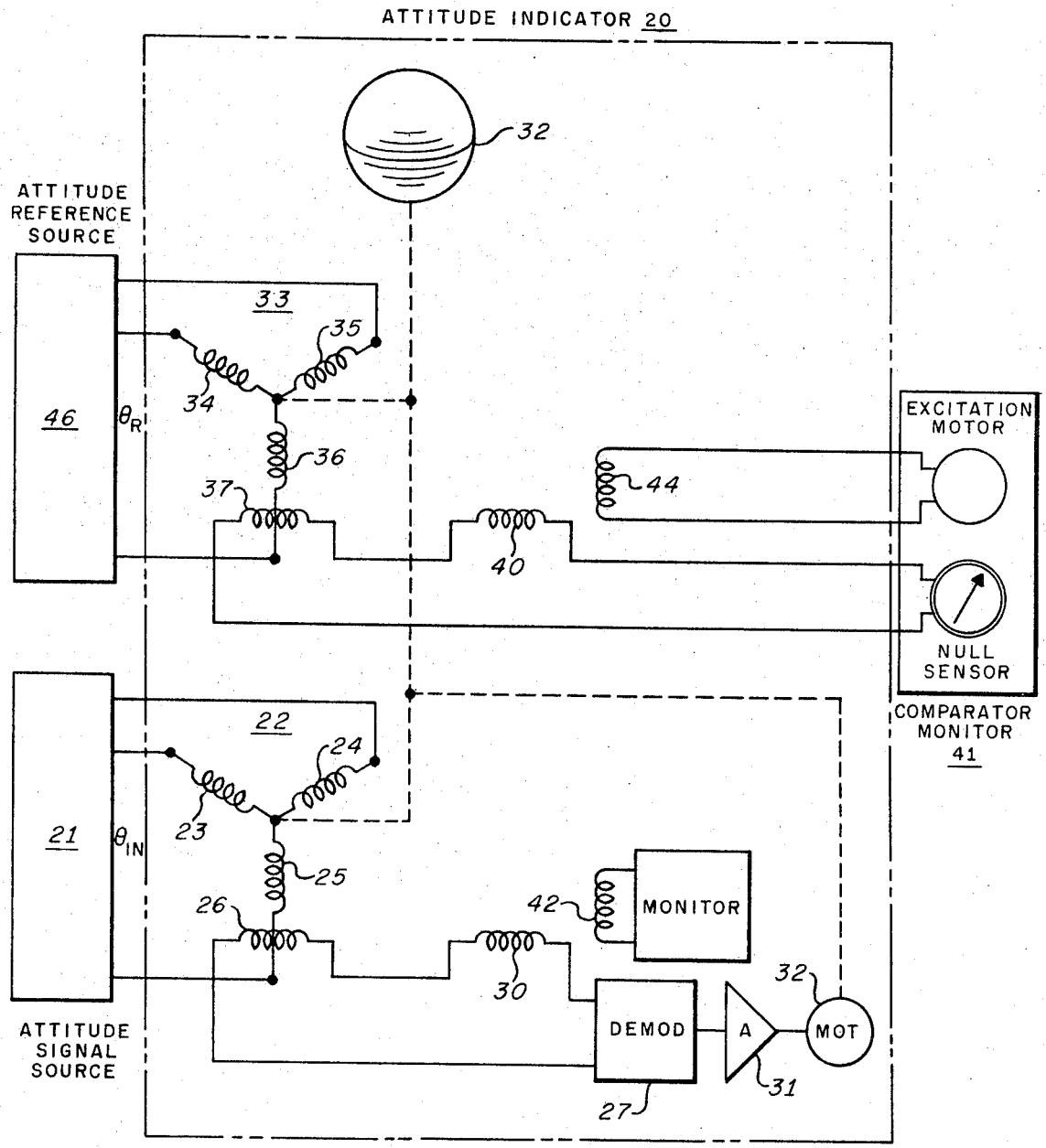
FIG. 3 is a schematic drawing of an attitude indicator incorporating the invention.
Figure 4:
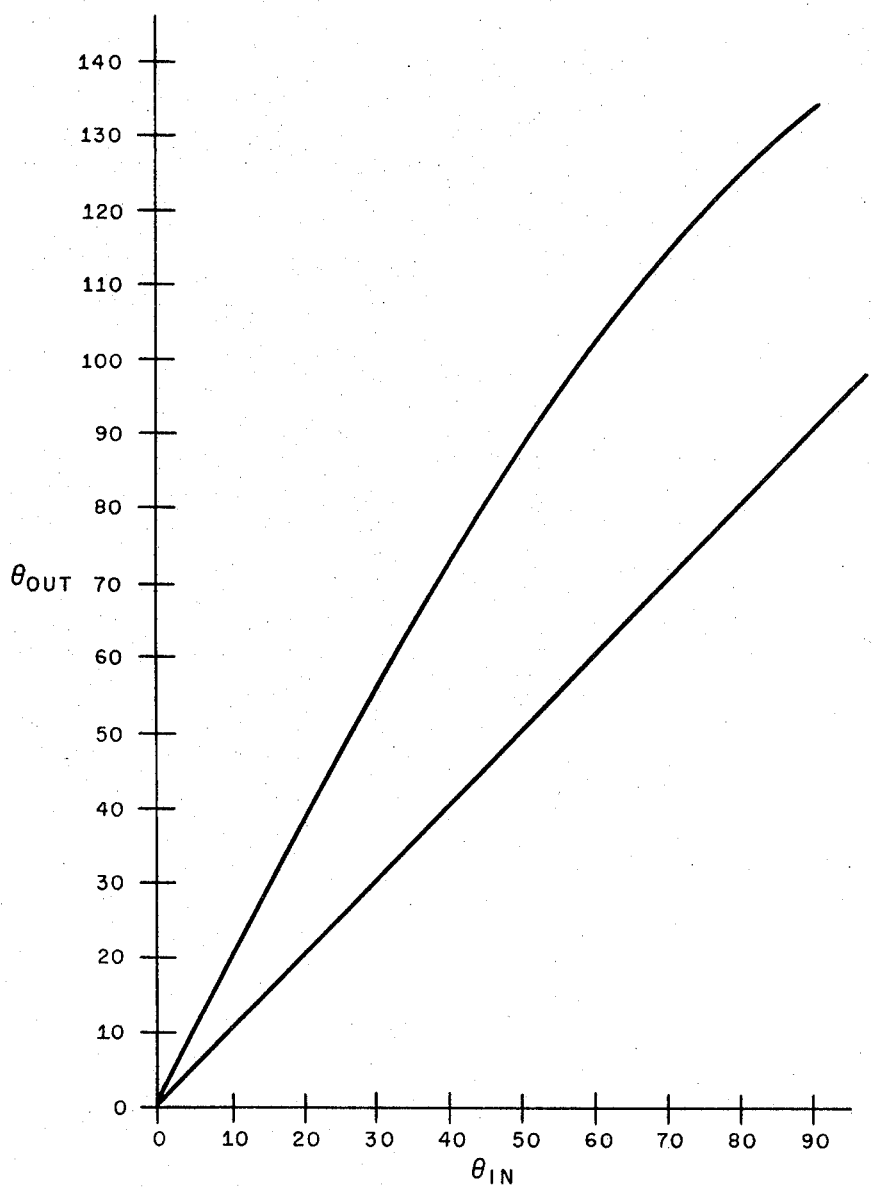
FIG. 4 is a graph of the transfer characteristic of the invention incorporated in the attitude indicator.

A specific application of this device is an attitude sensor 20 as shown in FIG. 3. This sensor is fabricated to produce a two to one expansion of the output angle $\theta_{out}$ over 0° to 30° of input angle $\theta_{in}$ with the further requirement that for a value of input angle equal to 85°, the output angle must be less than 129°. The plot of the input angle $\theta_{in}$ against the output angle $\theta_{out}$ for the non-linear synchros 22 and 23 incorporated in FIG. 3 is shown in FIG. 4. As can be seen from this plot, these devices meet the imposed requirements.

In the attitude sensor 20, an attitude signal source 21 provides a three-phase signal which defines an input angle $\theta_{in}$. The non-linear synchro 22 includes three-phase rotor windings 23, 24 and 25 which are connected to the three-phase input signal $\theta_{in}$. A trim winding 26 is also mounted on the rotor with the three-phase windings 23, 24 and 25, in quadrature with the winding 25 and coupled to a demodulator 27. A first single phase stator winding 30 is electrically coupled to the trim winding 26 and the demodulator 27. The demodulator 27 senses any difference in output voltage from the trim winding 26 and the first stator winding 30 and applies an error signal voltage to an amplifier 31. The amplifier 31 increases the magnitude of the error signal which is used to control motor 32. The shaft of the motor 32 is mechanically coupled to the rotor of the synchro 22, the rotor of a second synchro 33 and a pitch indicator device 32. The second synchro 33 includes rotor and stator windings as described above in synchro 22. An attitude reference source 46 provides a three-phase reference signal which defines a reference angle $\theta_r$. Three-phase windings 34, 35 and 36 are mounted on the rotor of the synchro 33 and respond to the three-phase attitude reference signal. A trim winding 37 is also mounted on the rotor of synchro 33 in quadrature with the winding 36 as shown in FIG. 3. A first single phase winding 40 on the stator of the synchro 33 is electrically coupled to the trim winding 37 and a null sensor indicator in a comparator monitor 41.

A second single phase winding 42 identical to stator winding 30 is also wound on the stator of the synchro 22 for providing an output voltage when the difference between the angle input signal $\theta_{in}$ and the mechanical angle of the synchro rotor is less than 90° with respect to the stator. In this embodiment the windings 25 and 36 are unbalanced and function in place of a shorted single phase winding to act as a damping winding to provide control of the non-linear relationship between the voltages induced in the trim winding 26, the first single phase winding 30, the trim winding 37 and the first single phase winding 40.

The function of the second synchro 33 is to indicate when a null is present between the angles defined by the attitude reference signal received from the attitude reference source 46 and the mechanical angular displacement produced by the motor 32. When these angles are equal in magnitude, the output voltage in the trim winding 37 will be equal to the output voltage in the first single phase winding 40 and a null indication will be produced by the null sensor in the comparator monitor 41. A second single phase winding 44 mounted on the stator of the synchro 33 produces an output when the difference between the angle $\theta_r$ and the mechanical angle of the synchro rotor is less than 90°. This output provides a visual indication that excitation is present in the excitation monitor of the comparator monitor 41. The signals sensed by the comparator monitor 41 will indicate if an excitation and a null are present thereby verifying the correctness of the pitch indication in display 32. If, however, the reference angle is not the same as the mechanical angle, the null sensor will not indicate a null and, if the excitation to synchro 33 is lost, the excitation monitor will detect a failure by loss of the excitation indication and cause a warning signal to be produced.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. In an attitude indicator device coupled to an attitude signal source and an attitude reference source, a first servo mechanism comprising
   a synchro device including
      a rotor,
      single phase wye-connected winding means mounted on said rotor and coupled to said attitude signal source,
      trim winding means mounted on said rotor and wound in quadrature with one of said wye-connected winding means,
      a stator,
      first single phase winding means mounted on said stator and electrically coupled to said trim winding means for producing an error voltage output in the absence of a null voltage across said series combination,
      a second single phase winding means wound on said stator in quadrature with said first single phase winding means having a voltage induced whenever the difference between said input angle data and said output angle data is less than 90°,
   monitor means coupled to said single phase winding for providing a visual indication when excitation is present in said single phase winding,
   motor means responsive to said error voltage output and mechanically coupled to said rotor for providing non-linear angular displacement of said rotor to reduce said error voltage to a null, and display means coupled to said motor means for providing a visual indication of said non-linear angular displacement which produces said null.

2. In an attitude indicator device as described in claim 1 said combination including a second servo mechanism coupled to said attitude reference course comprising a synchro device having a rotor, single phase wye-connected winding means mounted on said rotor and coupled to said attitude reference source, said rotor being mechanically coupled to said motor means and said synchro device in said first servo mechanism, trim winding means mounted on said rotor and wound in quadrature with one of said single phase wye-connected winding means, first single phase winding means mounted on said stator, and null sensing means coupled between said trim winding means and said first single phase winding means for indicating a null when said attitude reference source provides a signal that defines an angle equal in magnitude to said non-linear angular displacement of said rotor in said first servo mechanism.

3. A synchro device for providing output angle data which is a non-linear function of applied input angle data comprising a stator, single phase wye-connected winding means mounted on said stator and responsive to said applied input angle data for producing a primary flux within said device, a rotor disposed within said stator for producing output angle data in accordance with the angular position of said rotor with respect to said stator, single phase winding means mounted on said rotor for producing rotor voltages in response to said flux, and single phase winding means mounted on said stator in quadrature with one of said single phase wye-connected winding means and connected in series with said single phase rotor winding means, said single phase trim winding means includes means for producing voltages of magnitudes equal to said induced rotor voltages at angular positions of said rotor, said positions varying at a greater angular rate than said applied input angle data over an initial range of input angle, at a lesser angular rate over an intermediate range of input angle and at a greater angular rate over a terminal range of input angle.

4. A synchro device as described in claim 3 in which said single phase trim winding means further includes means for producing a ratio between the maximum value of trim voltage induced in said single phase trim winding means and the maximum value of voltage induced in said single phase rotor winding means which controls the angular rate at which said rotor angular positions are varied.

5. A synchro device as described in claim 3 which further includes shorted damping winding means mounted on said rotor for producing flux which reduces said induced rotor voltages at a greater rate than said induced trim voltages thereby providing additional control of the angular rate at which said rotor angular positions are varied.

6. A synchro device as described in claim 3 in which said wye-connected single phase winding means include two windings having an equal number of turns and a third winding having a greater number of turns for producing an increasing percentage of total flux in said synchro as said input angle data changes from zero thereby providing additional control of the angular rate at which said rotor angular positions are varied.

7. A synchro device as described in claim 6 in which said wye-connected single phase winding means includes two windings having an equal number of turns and a third winding having a lesser number of turns.

* * * * *